(12) United States Patent
Oh et al.

(10) Patent No.: US 9,658,753 B2
(45) Date of Patent: May 23, 2017

(54) TOUCH SCREEN DEVICE WITH NORMAL AND SLEEP MODES AND METHOD FOR DRIVING THE SAME

(71) Applicant: LG Display Co., Ltd., Seoul (KR)

(72) Inventors: Jun Seok Oh, Seoul (KR); Shi Cheol Song, Goyang-si (KR); Sun Young Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/720,094

(22) Filed: May 22, 2015

(65) Prior Publication Data

US 2016/0188142 A1 Jun. 30, 2016

(30) Foreign Application Priority Data

Dec. 26, 2014 (KR) .......................... 10-2014-0190621

(51) Int. Cl.
*G06F 3/045* (2006.01)
*G06F 3/044* (2006.01)
(Continued)

(52) U.S. Cl.
CPC ............ *G06F 3/0484* (2013.01); *G06F 1/324* (2013.01); *G06F 1/3262* (2013.01);
(Continued)

(58) Field of Classification Search
CPC ...... G06F 1/3262; G06F 3/044; G06F 1/3287; G06F 1/324; G06F 1/3265; G06F 3/045;
(Continued)

(56) References Cited

U.S. PATENT DOCUMENTS

| 8,816,985 B1 * | 8/2014 | Tate et al. ..................... 345/173 |
| 2008/0162996 A1 * | 7/2008 | Krah ........................ G06F 3/044 345/173 |

(Continued)

FOREIGN PATENT DOCUMENTS

| CN | 101937662 A | 1/2011 |
| CN | 102314830 A | 1/2012 |

(Continued)

OTHER PUBLICATIONS

European Search Report for European Patent Application No. EP 15192332.3, Mar. 15, 2016, 7 Pages.

(Continued)

*Primary Examiner* — Adam J Snyder
(74) *Attorney, Agent, or Firm* — Fenwick & West LLP

(57) ABSTRACT

A touch sensitive display device and a method for driving the same capable of increasing the touch recognition rate of the touch sensitive display device in the sleep mode are disclosed. The touch sensitive display device supports a normal mode and a sleep mode. The display device includes touch driving lines and a touch driver to supply one or more touch driving signals to the touch driving lines. The touch driver supplies the one or more touch driving signals at a first frequency during the normal mode of the touch sensitive display device, supplies the one or more touch driving signals at a second frequency during a first portion of the sleep mode of the touch sensitive display device, and supplies the one or more touch driving signals at a third frequency during a second portion of the sleep mode of the touch sensitive display device.

14 Claims, 6 Drawing Sheets

(51) Int. Cl.
*G06F 3/0484* (2013.01)
*G06F 1/32* (2006.01)
*G06F 3/041* (2006.01)
*G09G 3/36* (2006.01)

(52) U.S. Cl.
CPC .......... *G06F 1/3265* (2013.01); *G06F 1/3287* (2013.01); *G06F 3/044* (2013.01); *G06F 3/045* (2013.01); *G06F 3/0412* (2013.01); *G06F 3/0416* (2013.01); *G09G 3/36* (2013.01); *G06F 2203/04101* (2013.01); *G06F 2203/04104* (2013.01); *G06F 2203/04113* (2013.01); *G06F 2203/04808* (2013.01); *G09G 2330/021* (2013.01); *G09G 2330/022* (2013.01); *Y02B 60/1282* (2013.01); *Y02B 60/32* (2013.01)

(58) Field of Classification Search
CPC .... G06F 3/0484; G06F 3/0416; G06F 3/0412; G09G 3/36; Y02B 60/1282; Y02B 60/32
USPC ........................................ 345/174; 178/18.06
See application file for complete search history.

(56) References Cited

U.S. PATENT DOCUMENTS

| | | | | |
|---|---|---|---|---|
| 2008/0246723 | A1* | 10/2008 | Baumbach | G06F 3/044 345/156 |
| 2009/0189867 | A1* | 7/2009 | Krah | G06F 3/044 345/173 |
| 2010/0253639 | A1* | 10/2010 | Huang | G06F 3/044 345/173 |
| 2011/0050629 | A1* | 3/2011 | Homma et al. | 345/174 |
| 2011/0061947 | A1* | 3/2011 | Krah | G06F 3/041 178/18.01 |
| 2011/0063993 | A1* | 3/2011 | Wilson | G06F 3/044 178/18.01 |
| 2011/0193852 | A1* | 8/2011 | Lee et al. | 345/213 |
| 2012/0001950 | A1 | 1/2012 | Kim | |
| 2012/0280933 | A1* | 11/2012 | Lai | G06F 3/044 345/174 |
| 2013/0229382 | A1* | 9/2013 | Huang | G06F 3/044 345/174 |
| 2013/0265276 | A1* | 10/2013 | Obeidat | G06F 3/044 345/174 |
| 2013/0293484 | A1* | 11/2013 | Singh | G06F 3/0416 345/173 |
| 2013/0321382 | A1* | 12/2013 | Nagao | 345/212 |
| 2013/0328797 | A1* | 12/2013 | Al-Dahle | G06F 3/0416 345/173 |
| 2014/0092031 | A1* | 4/2014 | Schwartz | G06F 3/044 345/173 |
| 2014/0104208 | A1* | 4/2014 | Lee et al. | 345/173 |
| 2014/0145985 | A1 | 5/2014 | Akai et al. | |
| 2014/0184518 | A1* | 7/2014 | Valavi | 345/173 |
| 2014/0253497 | A1* | 9/2014 | Chen | G06F 3/044 345/174 |
| 2015/0100808 | A1 | 4/2015 | Deng | |

FOREIGN PATENT DOCUMENTS

| | | |
|---|---|---|
| CN | 103064624 A | 4/2013 |
| EP | 2402931 A1 | 1/2012 |
| EP | 2650689 A1 | 11/2013 |
| KR | 10-2009-0017557 | 2/2009 |
| KR | 10-2013-0121050 | 11/2013 |
| TW | 200717410 A | 5/2007 |

OTHER PUBLICATIONS

Office Action for Taiwanese Patent Application No. TW 10520909000, Jul. 25, 2016, 10 Pages (With Concise Explanation of Relevance).

* cited by examiner

TOUCH SCREEN DEVICE WITH NORMAL AND SLEEP MODES AND METHOD FOR DRIVING THE SAME

CROSS-REFERENCE TO RELATED APPLICATIONS

This application claims the benefit of the Korean Patent Application No. 10-2014-0190621 filed on Dec. 26, 2014, which is hereby incorporated by reference as if fully set forth herein.

BACKGROUND

Field of the Invention

This document relates to a touch screen device and a method for driving the same.

Discussion of the Related Art

Recently various input devices such as a keyboard, a mouse, a track ball, a joystick and a digitizer are used to configure an interface between a user and one of various information communication devices. Therefore, demands for the input devices that are simple and convenient have been increased. To meet these demands, a touch screen device that inputs information by directly touching a touch screen of the touch screen device using a finger or a pen has been introduced. The touch screen device is an input device that a user may use easily merely by touching a button displayed in a display area using a finger. Therefore, the touch screen device has been applied to a portable display device like a smartphone, a tablet, a PMP (portable multimedia player), and so on.

The touch screen device is driven as a sleep mode for reducing power consumption when a user does not touch the touch screen for a predetermined period. The touch screen device does not wake up even though a user touches the touch screen because the touch screen device is at an idle state in the sleep mode. The user may feel uncomfortable because the user must touch a special button to wake up the touch screen device from sleep mode.

To solve this uncomfortableness, a method that wakes up the touch screen device from the sleep mode even when the user touches the touch screen has been introduced. For instance, the touch screen device may be awaken from the sleep mode when the user taps the touch screen more than twice or draws a predetermined pattern on the touch screen. However, the touch screen device may not sense a user's touch because the touch screen device senses the user's touch at a low frequency in the sleep mode for reducing power consumption. That is, the related art touch screen device may have a problem of having a low touch recognition rate in the sleep mode.

SUMMARY

The present invention has been made in an effort to provide a touch sensitive display device and a method for driving the same capable of increasing the touch recognition rate of the touch screen device in the sleep mode.

In one embodiment, a touch sensitive display device supporting a normal mode and a sleep mode is disclosed. The display device includes touch driving lines and a touch driver to supply one or more touch driving signals to the touch driving lines. The touch driver supplies the one or more touch driving signals at a first frequency during the normal mode of the touch sensitive display device. The touch driver supplies the one or more touch driving signals at a second frequency during a first portion of the sleep mode of the touch sensitive display device. The touch driver supplies the one or more touch driving signals at a third frequency during a second portion of the sleep mode of the touch sensitive display device, the second frequency and the third frequency being different from each other.

In one embodiment, the touch sensitive display device further comprises pixels and data lines coupled to the pixels. A data driver supplies the data lines with data voltages during the normal mode, and the data driver does not supply the data lines with data voltages during the sleep mode.

In one embodiment, the second frequency is lower than the first frequency, and the third frequency is lower than the second frequency.

In one embodiment, the touch sensitive display device further comprises a touch controller to compare touch data sensed by the touch driver during the first portion of the sleep mode to a first reference. The touch controller also compares touch data sensed by the touch driver during the second portion of the sleep mode to a second reference different than the first reference. The second reference can be is lower than the first reference.

In one embodiment, the first portion of the sleep mode comprises one or more frame periods that immediately follow a change from the normal mode to the sleep mode, and the second portion of the sleep mode is after the first portion of the sleep mode.

In one embodiment, the touch sensitive display device further comprises a touch controller to wake the touch sensitive display device to return to the normal mode responsive to touch data sensed during the first portion of the sleep mode exceeding a first reference. In one embodiment, the touch driver again supplies the touch driving signals to the touch lines at the second frequency during a third portion of the sleep mode responsive to touch data sensed during the second portion of the sleep mode exceeding a second reference. Additionally, the touch controller wakes the touch sensitive display device to return to the normal mode responsive to touch data sensed during the third portion of the sleep mode exceeding the first reference.

In one embodiment, a method of operation in a touch sensitive display device supporting a normal mode and a sleep mode is disclosed. The method comprises supplying one or more touch driving signals to touch driving lines at a first frequency during the normal mode of the touch sensitive display device. The method comprises supplying the one or more touch driving signals to the touch driving lines at a second frequency during a first portion of the sleep mode of the touch sensitive display device. The method also comprises supplying the one or more touch driving signals to the touch driving lines at a third frequency during a second portion of the sleep mode of the touch sensitive display device, the second frequency and the third frequency being different from each other.

In one embodiment, a touch sensitive display device supporting a normal mode and a sleep mode is disclosed. The display device comprises touch driving lines and a touch driver to supply one or more touch driving signals to the touch driving lines based on at least one frequency control signal. A touch controller generates the at least one frequency control signal. The at least one frequency control signal indicates a first frequency setting for the touch driving signals during the normal mode of the touch sensitive display device. The at least one frequency control signal indicates a second frequency setting for the touch driving signals during a first portion of the sleep mode of the touch sensitive display device. The at least one frequency control signal indicates a third frequency setting for the touch driving signals during a second portion of the sleep mode of the touch sensitive display device, the second frequency setting and the third frequency setting being different from each other.

The features and advantages described in this summary and the following detailed description are not intended to be limiting. Many additional features and advantages will be apparent to one of ordinary skill in the art in view of the drawings, specification and claims.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, a foldable display apparatus according to embodiments of the present invention will be described in detail with reference to the accompanying drawings.

Figure 1:
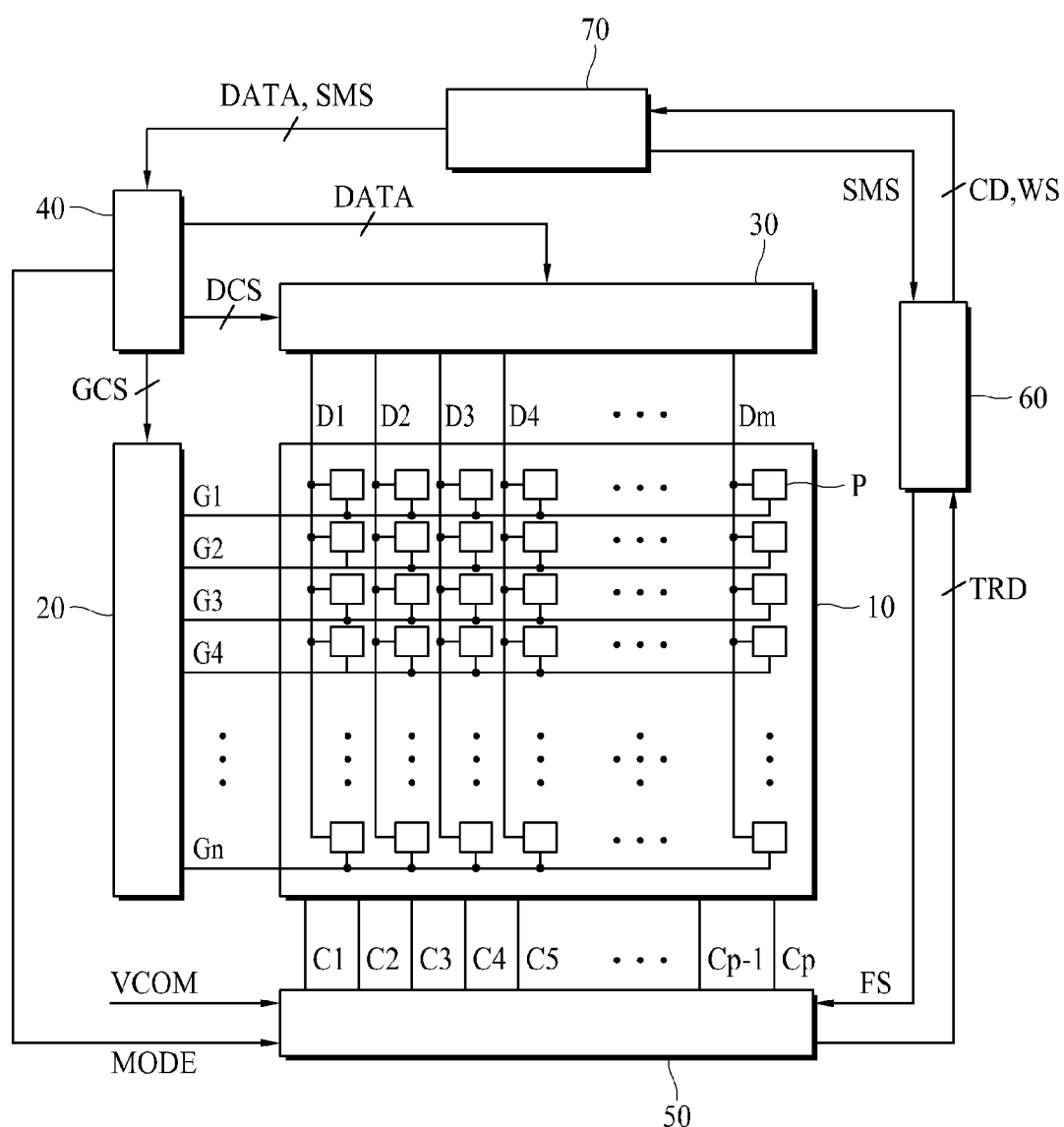
FIG. 1 is a block diagram showing a touch screen device according to an embodiment of the present invention.
Figure 2:
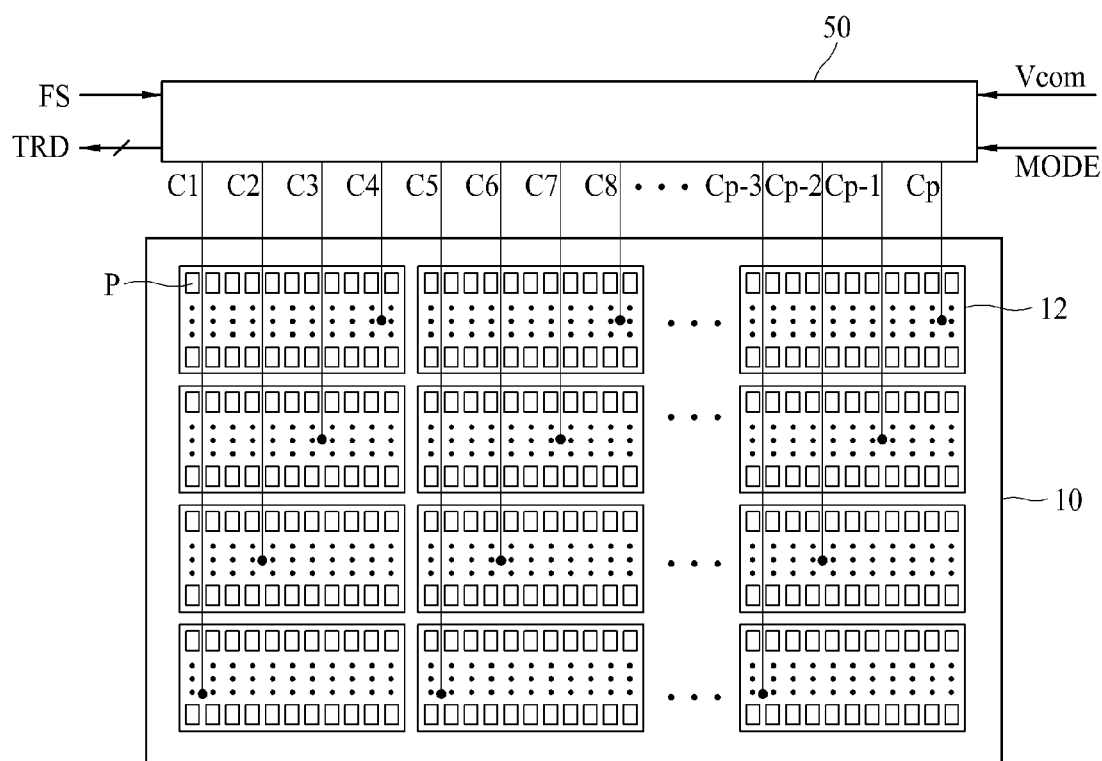
FIG. 2 is an exemplary diagram showing pixels, touch electrodes, touch driving lines of a display panel and a touch driver of FIG. 1.
Figure 3:
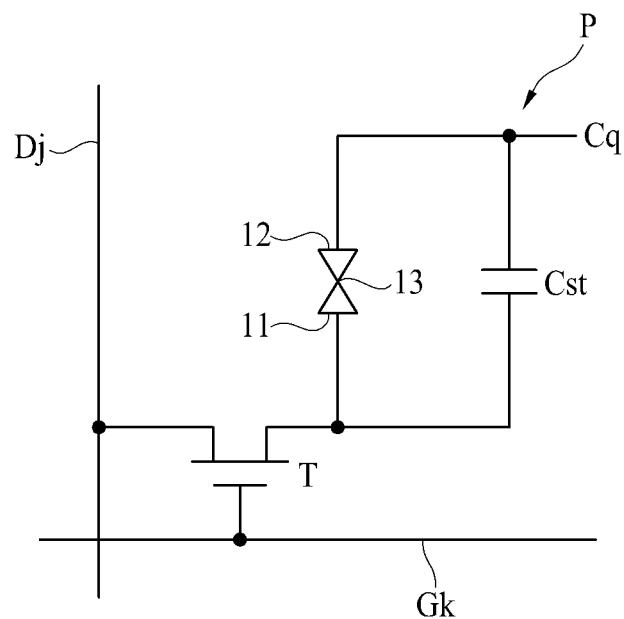
FIG. 3 is an exemplary diagram showing a pixel of FIG. 2.

FIG. 1 is a block diagram showing a touch screen device according to an embodiment of the present invention. FIG. 2 is an exemplary diagram showing pixels, touch electrodes, touch driving lines of a display panel and a touch driver of FIG. 1. FIG. 3 is an exemplary diagram showing a pixel of FIG. 2. The touch screen device according to the embodiment of the present invention is described in the below with reference to FIGS. 1 to 3. Embodiments herein may also refer to the touch screen device as a touch sensitive display device.

The touch screen device according to the embodiment of the present invention is driven using a self-capacitance method, however it is not limited thereto. That is, the touch screen device according to the embodiment of the present invention may be driven using one of other methods such as a mutual capacitance method.

The touch screen device using the self-capacitance method has one type of touch electrodes coupled to touch driving lines. Thus, in the touch screen device using the self-capacitance method, touch driving signals from a touch driver are supplied to the touch electrodes via the touch driving lines and also voltages of the touch electrodes are sensed to the touch driver via the touch driving lines.

On the other hand, the touch screen device using the mutual capacitance method has two types of touch electrodes including Tx electrodes coupled to Tx signal lines and Rx electrodes coupled to Rx signal lines. Thus, in the touch screen device using the mutual capacitance method, touch driving signals from a Tx driver are supplied to the Tx electrodes via the Tx signal lines and sensing signals from the Rx electrodes are sensed to a Rx driver via the Rx signal lines.

Also, the touch screen device according to the embodiment of the present invention may be implemented as an in-cell type device. In the case of the in-cell type device, the touch electrodes are provided in a display panel. However, the present invention is not limited thereto. That is, the touch screen device according to the embodiment of the present invention may be implemented as an on-cell type device. In the case of the on-cell type device, the touch electrodes are provided on a display panel.

Furthermore, the touch screen device according to the embodiment of the present invention is implemented as a liquid crystal display (LCD), however is not limited thereto. That is, the touch screen device according to the embodiment of the present invention may be implemented as a flat display device such as an organic light emitting display (OLED), a plasma display device (PDP), a field emission display (FED), an electrophoresis display (EPD) and so on.

The touch screen device according to the embodiment of the present invention includes a display panel 10, a gate driver 20, a data driver 30, a timing controller 40, a touch driver 50, a touch controller 60 and a main processor 70 as shown in FIG. 1.

The display panel 10 includes an upper substrate, a lower substrate, and a liquid crystal layer interposed between the upper substrate and the lower substrate. Data lines D1 to Dm (m is a positive integer equal to or greater than 2), gate lines G1 to Gn (n is a positive integer equal to or greater than 2), and touch driving lines C1 to Cp (p is a positive integer equal to or greater than 2) are disposed on the lower substrate of the display panel 10. The data lines D1 to Dm and the touch driving lines C1 to Cp may intersect with the gate lines G1 to Gn.

Pixels are arranged in a matrix form based on a crossing structure of gate lines GL1 to GLm and data lines DL1 to DLn as shown in FIG. 1. Each pixel P may be coupled to a data line and a gate line. Each pixel P may include a transistor T, a pixel electrode 11, a liquid crystal cell 13 and a storage capacitor Cst as shown in FIG. 3. The transistor T is turned on according to a gate signal of a kth (k is a positive integer equal to or less than n) gate line, thus supplies a data voltage of a jth (j is a positive integer equal to or less than m) data line. A common voltage is supplied to a touch electrode 12 from one of touch driving lines C1 to Cp. The touch electrode 12 functions as a common electrode when the common voltage is supplied to the touch electrode 12. Therefore, each pixel P adjusts a transmission amount of light by driving liquid crystals of the liquid crystal cell 13 according to a voltage difference between the data voltage supplied to pixel electrode 11 and the common voltage to the touch electrode 12, thereby displaying the image. Also, the storage capacitor Cst is provided between the pixel electrode 11 and the touch electrode 12 and maintains the voltage difference between the data voltage supplied to pixel electrode 11 and the common voltage to the touch electrode 12.

A plurality of touch electrodes 12 are provided in the display panel 10 as shown in FIG. 2. Each touch electrode 12 may be overlapped with a plurality of pixels P. It is desirable to set a size of the touch electrode 12 to correspond to a contact area of a user's finger or a pen.

Figure 4A:
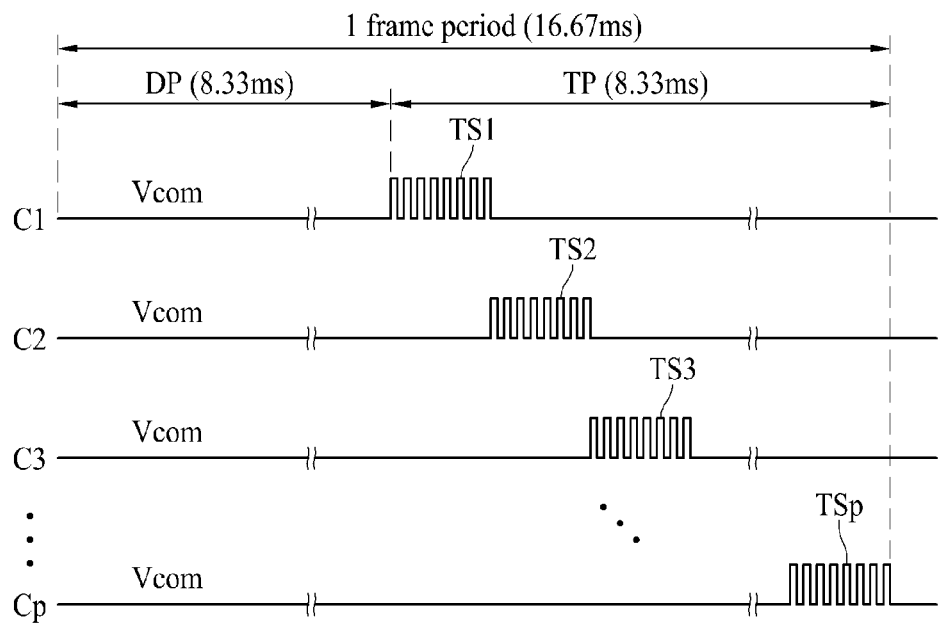
FIG. 4A is a waveform diagram showing signals supplied to touch driving lines in a normal mode.
Figure 4B:
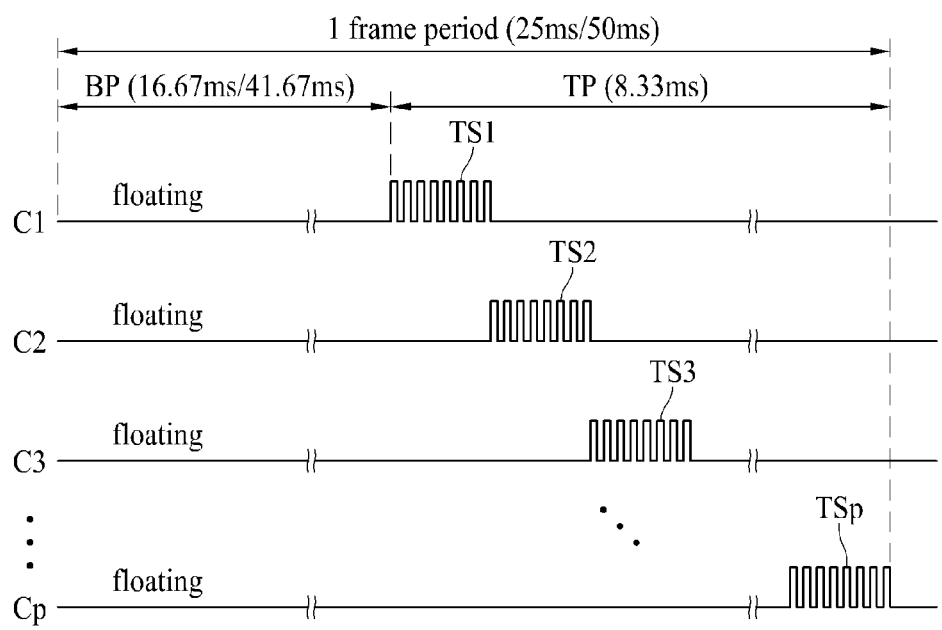
FIG. 4B is a waveform diagram showing signals supplied to touch driving lines in a sleep mode.

The touch electrodes 12 may be coupled to the touch driver 50 via the touch driving lines C1 to Cp as shown in FIG. 2. The common voltage is supplied to the touch electrodes 12 from the touch driver 50 via the touch driving lines C1 to Cp during a display driving period DP in a normal mode as shown in FIG. 4A. Also, the touch driving signals TS1 to TSp are supplied to the touch electrodes 12 from the touch driver 50 via the touch driving lines C1 to Cp during a touch sensing period TP in the normal mode and a sleep mode as shown in FIGS. 4A and 4B. Each touch driving line C1 to Cp is disposed between adjacent two pixels P as shown in FIG. 2.

Black matrix, color filters, etc. are formed on the upper substrate of the display panel 10. However, the black matrix and the color filters are formed on the lower substrate of the display panel 10 when the display panel 10 has a COT (color filters on array) structure.

Polarizing plates are respectively attached to the upper substrate and the lower substrate of the display panel 10. Alignment layers for setting a pre-tilt angle of the liquid crystals are respectively formed on the upper substrate and the lower substrate of the display panel 10. Column spacers for maintaining a gap of a liquid crystal cell 13 are formed between the upper substrate and the lower substrate of the display panel 10.

The touch screen devices according to the embodiment of the present invention further includes a backlight unit disposed in the rear of lower substrate of the display panel 10. The backlight unit uniformly radiates light onto the display panel 10. The backlight unit may be implemented as an edge type backlight unit or a direct type backlight unit.

The gate driver 20 generates gate signals (or scan signals) based on a gate timing control signal GCS input from the timing controller 40. The gate driver 20 supplies the gate signals to the gate lines G1 to Gn by a predetermined order during the display driving period DP in the normal mode. The predetermined order is a sequential order (or progressive order). The gate driver 20 does not supply the gate signals to the gate liens G1 to Gn during the touch sensing period TP in the normal mode, and during a blank period BP and the touch sensing period TP in the sleep mode.

The data driver 30 receives digital video data DATA and a data timing control signal DCS from a timing controller 40. The data driver 30 converts the digital video data DATA into analog data voltages based on the data timing control signal DCS. The data driver 30 supplies the data voltages to the data lines D1 to Dm during the display driving period DP in the normal mode. The data driver 30 does not supply the data voltages to the data lines D1 to Dm during the touch sensing period TP in the normal mode, and during the blank period BP and the touch sensing period TP in the sleep mode.

The timing controller 40 receives the digital video data DATA and timing signals, such as a vertical sync signal, a horizontal sync signal, a data enable signal, and a dot clock, from the main processor 70. The vertical sync signal is a signal for defining one frame period. The horizontal sync signal is a signal for defining one horizontal period supplying data voltages to pixels arranged along one horizontal line. The pixels arranged along the one horizontal line are coupled to one gate line. The data enable signal is a signal for defining periods in which valid digital video data are supplied. The dot clock is a signal repeated in a short cycle.

The timing controller 40 receives a sleep mode control signal SMS from the main processor 70. The timing controller 40 controls operations of the gate driver 20 and the data driver 30 in the normal mode when the timing controller 40 receives the sleep mode control signal SMS having a first logic level voltage. The timing controller 40 separates one frame period into the display driving period DP and the touch sensing period TP in the normal mode as shown in FIG. 4A. The timing controller 40 controls the gate driver 20 to supply the gate signals to the gate lines G1 to Gn and controls the data driver 30 to supply the data voltages to the data lines D1 to Dm in the normal mode. Meanwhile, the one frame period may separate a plurality of display driving periods DP and touch sensing periods TP.

The timing controller 40 generates the gate timing control signal GCS for controlling operation timing of the gate driver 20 and the data timing control signal DCS for controlling operation timing of the data driver 30 in the normal mode. The timing controller 40 outputs the gate timing control signal GCS to the gate driver 20 and the data timing control signal DCS to the data driver 30 in the normal mode.

The timing controller 40 may generate a mode signal MODE for separating the display driving period DP and the touch sensing period TP in the normal mode. The timing controller 40 may output the mode signal MODE to the touch driver 50.

The timing controller 40 controls operations of the gate driver 20 and the data driver 30 in the sleep mode when the timing controller 40 receives the sleep mode control signal SMS having a second logic level voltage. The timing controller 40 controls the gate driver 20 and the data driver 30 to be at an idle state in the sleep mode. Also, the timing controller 40 controls itself at the idle state in the sleep mode. That is, the gate driver 20, the data driver 30 and the timing controller 40 are at the idle state, and thus the touch screen device of the embodiment of the present invention may have decreased power consumption.

The touch driver 50 receives the mode signal MODE from the timing controller 40, a frequency control signal FS from the touch controller 60, and the common voltage Vcom from a power supply unit. The touch driver 50 supplies the touch driving signals TS1 to TSp to the touch electrodes 12 according to a touch driving frequency determined by the frequency control signal FS. And then, the touch driver 50 senses voltages of the touch electrodes 12, and converts the sensed voltages into touch raw data TRD, and outputs the touch raw data TRD to the touch controller 60.

In normal mode, the touch driver 50 operates by separating one frame period into the display driving period DP and the touch sensing period TP according to the mode signal MODE as shown in FIG. 4A. The touch driver 50 may supply the common voltage Vcom to the touch driving lines C1 to Cp during the display driving period DP in the normal mode when the mode signal MODE having a first logic level voltage is input to the touch driver 50. Also, the touch driver 50 may supply the touch driving signals TS1 to TSp to the touch driving lines C1 to Cp by a predetermined order during the touch sensing period TP in the normal mode when the mode signal MODE having a second logic level voltage is input to the touch driver 50. The predetermined order may be a sequential order as shown in FIG. 4A. In FIG. 4A, the touch driving signals TS1 to TSp have a higher level voltage than the common voltage Vcom, however are not limited thereto.

The touch driver 50 may set the touch driving frequency to a first frequency when the frequency control signal FS having a first value is input to the touch driver 50 in the normal mode. Thus, the touch driver 50 may supply the touch driving signals TS1 to TSp according to the first frequency. Each touch driving signal may have a plurality of pulses. Therefore, the touch driver 50 may output the touch raw data TRD to the touch controller 60 according to the first frequency.

In sleep mode, the touch driver 50 operates by separating one frame period into the blank period BP and the touch sensing period TP as shown in FIG. 4B. The touch driver 50 does not supply any voltage or signal to the touch driving lines C1 to Cp during the blank period BP in the sleep mode. That is, the touch driver 50 is at an idle state, thus the touch driving lines C1 to Cp are floated during the blank period in the sleep mode. Also, the touch driver 50 may supply the touch driving signals TS1 to TSp to the touch driving lines C1 to Cp by a predetermined order during the touch sensing period TP in the sleep mode. The predetermined order may be a sequential order as shown in FIG. 4B.

The touch driver 50 may set the touch driving frequency to a second frequency lower than the first frequency when the frequency control signal FS having a second value is input to the touch driver 50 in the sleep mode. Thus, the touch driver 50 may supply the touch driving signals TS1 to TSp according to the second frequency. Each touch driving signal may have a plurality of pulses. Therefore, the touch driver 50 may output the touch raw data TRD to the touch controller 60 according to the second frequency.

Also, the touch driver 50 may set the touch driving frequency to a third frequency lower than the second frequency when the frequency control signal FS having a third value is input to the touch driver 50 in the sleep mode. Thus, the touch driver 50 may supply the touch driving signals TS1 to TSp according to the third frequency. Each touch driving signal may have a plurality of pulses. Therefore, the touch driver 50 may output the touch raw data TRD to the touch controller 60 according to the third frequency.

The touch driver 50 may convert voltages of the touch electrodes 12 into the touch raw data TRD. For example, the touch driver 50 may sense voltages charged into capacitances of touch electrodes 12 and convert the sensed voltages into the touch raw data TRD. Alternatively, the touch driver 50 may sense RC delay values from touch electrodes 12 and convert the sensed RC delay values into the touch raw data TRD. The touch driver 50 may output the touch raw data TRD to the touch controller 60.

In FIG. 4A the first touch driving frequency is 60 Hz. When the first frequency is 60 Hz, one frame period may be approximately 16.67 ms. In FIG. 4B the second touch driving frequency is 40 Hz and the third touch driving frequency is 20 Hz. When the second frequency is 40 Hz, one frame period may be approximately 25 ms. When the third frequency is 20 Hz, one frame period may be approximately 50 ms. Touch driving frequency can be measured as the frequency at which groups of pulses are provided to a touch driving line C1-Cp and is directly related to the length of a frame period. Additionally, the display driving period DP and the touch sensing period TP in the normal mode and the blank period BP and the touch sensing period TP in the sleep mode may not be limited to the examples of FIGS. 4A and 4B.

The touch sensing period TP may be set to approximately 8.33 ms in both the normal mode and the sleep mode. That is, the touch sensing period TP may be set to approximately 8.33 ms regardless of the touch driving frequency. Touch driving frequency is controlled by extending the blank period BP. In this case, the blank period BP in the sleep mode may increase two or five times more than the display driving period DP in the normal mode. The higher the touch driving frequency is, the shorter one frame period is and the shorter the touch sensing cycle is. Thus, the higher the touch driving frequency is, the higher touch recognition rate is.

Also, the blank period BP may be set longer than the touch sensing period TP in the sleep mode. Therefore, the idle state period of the touch driver 50 is longer than the operation period, thus power consumption of the touch driver 50 may be decreased.

The touch controller 60 receives the touch raw data TRD from the touch driver 50 and compares the touch raw data TRD to a reference value. When touch raw data TRD equal to or greater than a first reference value are input to the touch controller 60, the touch controller 60 calculates a coordinate of a touch electrode 12 from which the touch raw data TRD equal to or greater than a first reference value is received as a touch coordinate. The touch controller 60 outputs touch coordinate data CD having information about touch coordinates to the main processor 70. Also, the touch controller 60 outputs a wake up signal WS to the main processor 70 when the touch raw data TRD equal to or greater than a first reference value are input to the touch controller 60.

The touch controller 60 receives the sleep mode control signal SMS from the main processor 70. The touch controller 60 controls the touch driving frequency of the touch driver 50 differently between the normal mode and the sleep mode.

The touch controller 60 operates in the normal mode when the sleep mode control signal SMS having the first logic level voltage is input to the touch controller 60. The touch controller 60 calculates the touch coordinates at the first frequency, and outputs the touch coordinate data CD to the main processor 70 in the normal mode. The touch controller 60 outputs the frequency control signal FS having the first value to the touch driver 50.

The touch controller 60 operates in the sleep mode when the sleep mode control signal SMS having the second logic level voltage is input to the touch controller 60. The touch controller 60 sets the touch driving frequency at the second or third frequency in the sleep mode. The touch controller 60 outputs the frequency control signal FS having the second value to the touch driver 50 when the touch controller 60 sets the touch driving frequency at the second frequency. The touch controller 60 outputs the frequency control signal FS having the third value to the touch driver 50 when the touch controller 60 sets the touch driving frequency at the third frequency.

Meanwhile, the touch driving frequency may be substantially same as a frequency for supplying touch driving signals from the touch driver 50 to the touch driving lines C1 to Cp, a frequency for outputting the touch raw data TRD from the touch driver 50 to the touch controller 60, and a frequency for outputting the touch coordinate data CD from the touch controller 60 to the main processor 70. A method for controlling the touch driving frequency of the touch controller 60 is described with reference to FIGS. 5 and 6.

The main processor 70 is implemented as CPU (central processing unit), a host processor, an application processor, or a GPU (graphic processing unit) of one of a navigation system, a set top box, a DVD player, a Blu-ray player, a personal computer (PC), a notebook, a home theater system, a smartphone, a tablet, a portable display device, etc.

The main processor 70 outputs the sleep mode control signal SMS having the first logic level to the timing controller 40 and the touch controller 60 in the normal mode. The main processor 70 converts the digital video data DATA into data having an appropriate format for displaying in the display panel 10. Also, the main processor 70 receives the touch coordinate data CD having information about the touch coordinates from the touch controller 60 in the normal mode. The main processor 70 executes an application program of an icon located at the touch coordinate. The main processor 70 transmits the digital video data DATA and the timing signals to the timing controller 40 according to the executed application program.

The main processor 70 outputs the sleep mode control signal SMS having the second logic level voltage to the timing controller 40 and the touch controller 60 when the mode is changed from the normal mode to the sleep mode. And then, the main processor 70 is in the idle state in the sleep mode. The main processor 70 wakes when the wake up signal WS is input to the main processor 70. The main processor operates in the normal mode when the main processor wakes up.

As described above, the embodiment of the present invention controls the gate driver 20, the data driver 30, the timing controller 40 and the main processor 70 at the idle state in the sleep mode, thus may sense a user's touch by operating only the touch driver 50 and the touch controller 60 in the sleep mode. Therefore, the embodiment of the present invention may decrease power consumption of the touch screen device and sense a user's touch at the same time. Accordingly, the embodiment of the present invention may wake the touch screen device up in the sleep mode when a user taps the touch screen more than twice or draws a predetermined pattern on the display panel 10.

Meanwhile, the embodiment of the present invention controls the touch driving frequency differently in the normal mode and the sleep mode, especially changes the touch driving frequency at least once in the sleep mode to increase a touch recognition rate in the sleep mode.

Figure 5:
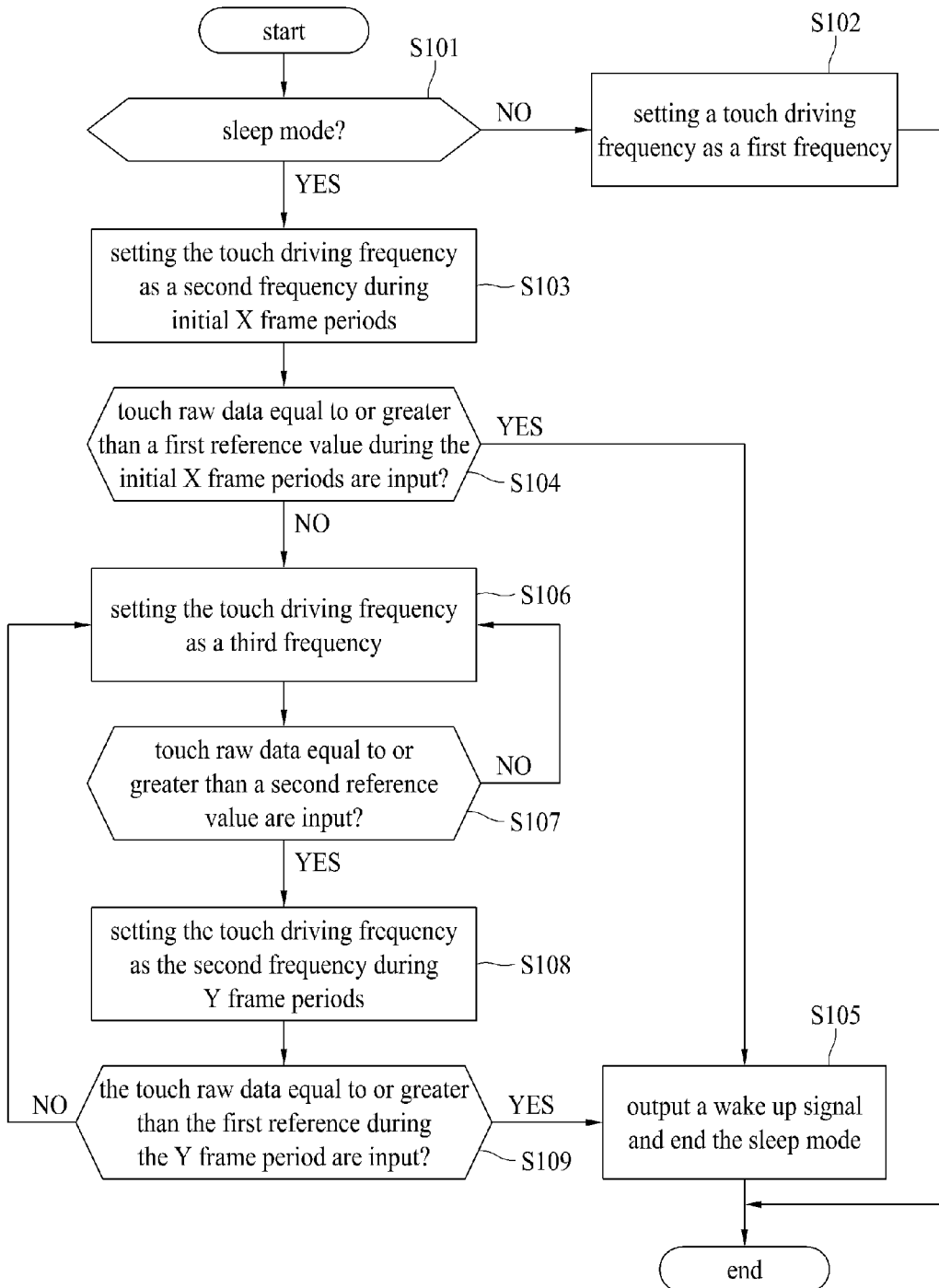
FIG. 5 is a flowchart showing a method for controlling a touch driving frequency according to an embodiment of the present invention.
Figure 6:
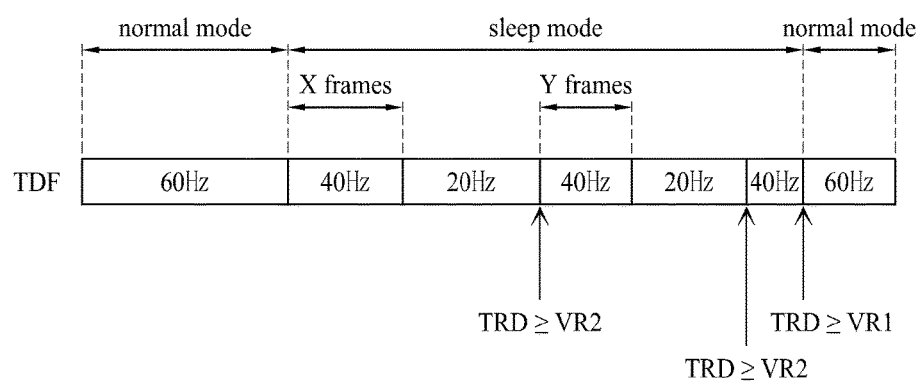
FIG. 6 is an exemplary diagram showing a touch driving frequency in a normal mode and a sleep mode of FIG. 5.

FIG. 5 is a flowchart showing a method for controlling a touch driving frequency according to an embodiment of the present invention. FIG. 6 is an exemplary diagram showing a touch driving frequency in a normal mode and a sleep mode of FIG. 5. It is exampled in FIG. 6 that the first frequency is 60 Hz, the second frequency is 40 Hz, and the third frequency is 20 Hz, however those are not limited thereto. The method for controlling the touch driving frequency according to the embodiment of the present invention is described with reference to FIGS. 1, 2, 5 and 6.

The method for controlling the touch driving frequency according to the embodiment of the present invention includes first to ninth steps S101 to S109.

First, in step S101, the touch controller 60 receives the sleep mode control signal SMS from the main processor 70. The touch controller 60 operates in the normal mode or the sleep mode according to the sleep mode control signal SMS. (See S101 in FIG. 5)

Second, in step S102, the touch controller 60 sets the touch driving frequency TDF to the first frequency 60 Hz in the normal mode as shown in FIG. 6. The touch controller 60 controls the touch driver 50 to drive at the first frequency 60 Hz and outputs the touch coordinate data CD to the main processor 70 at the first frequency 60 Hz.

More specifically, the touch controller 60 outputs the frequency control signal FS having the first value to the touch driver 50 in the normal mode. The touch driver 50 supplies the touch driving signals TS1 to TSp to the touch driving lines C1 to Cp according to the first frequency 60 Hz based on the frequency control signal FS having the first value. The touch driver 50 converts the sensing signals from the touch electrodes 12 into the touch raw data TRD. The touch driver 50 outputs the touch raw data TRD to the touch controller 60 according to the first frequency 60 Hz.

When touch raw data TRD equal to or greater than the first reference value are input to the touch controller 60, the touch controller 60 calculates a coordinate of a touch electrode 12 from which the touch raw data TRD equal to or greater than the first reference value as a touch coordinate. (TRD≥VR1) The touch controller 60 calculates touch coordinates and then outputs the touch coordinate data CD having information about the touch coordinates to the main processor 70 according to the first frequency 60 Hz. (See S102 in FIG. 5)

Third, in step S103, the touch controller 60 sets the touch driving frequency TDF at the second frequency 40 Hz during an initial portion of the sleep mode, such as the initial X frame periods in the sleep mode as shown in FIG. 6. That is, the touch controller 60 sets the touch driving frequency TDF to the second frequency 40 Hz during the initial X frame periods immediately following the mode change from the normal mode to the sleep mode. The touch controller 60 sets the touch driving frequency to the second frequency 40 Hz higher than the third frequency 20 Hz during the initial X frame periods in the sleep mode because a user frequently wakes up the touch screen device as soon as the touch screen device enters the sleep mode. Therefore, the embodiment of the present invention may increase a touch recognition rate by setting the touch driving frequency at the second frequency 40 Hz during the initial X frame periods in the sleep mode.

The touch controller 60 controls the touch driver 50 to operate at the second frequency 40 Hz. More specifically, the touch controller 60 outputs the frequency control signal FS having the second value to the touch driver 50 during the initial X frame periods in the sleep mode. The touch driver 50 supplies the touch driving signals TS1 to TSp to the touch driving lines C1 to Cp according to the second frequency 40 Hz based on the frequency control signal FS having the second value. The touch driver 50 converts the sensing signals from the touch electrodes 12 into the touch raw data TRD. The touch driver 50 outputs the touch raw data TRD to the touch controller 60 according to the second frequency 40 Hz.

In step S104, touch raw data TRD is compared to a first reference value. When touch raw data TRD equal to or greater than the first reference value are input to the touch controller 60 during the initial X frame periods in the sleep mode (TRD≥VR1), the touch controller 60 outputs the wake up signal WS to the main processor 70 in step S105. The main processor 70 wakes when the wake up signal WS is input to the main processor 70. Thus, the sleep mode is ended.

Alternatively, the touch controller 60 may output the wake up signal WS to the main processor 70 after a user input pattern is same as a predetermined pattern when the touch raw data equal to or greater than the first reference value are input to the touch controller 60 during the initial X frame periods in the sleep mode (TRD≥VR1). For example, the predetermined pattern may be tapping the touch screen more than or drawing a figure like a circle, a triangle or a quadrangle. (See S103, S104 and S105 in FIG. 5)

Fourth, in step S106, the touch controller 60 sets the touch driving frequency at the third frequency 20 Hz when the touch raw data TRD equal to or greater than the first reference value are not input to the touch controller 60. That is, the touch controller 60 sets the touch driving frequency at the third frequency 20 Hz after the initial X frame periods in the sleep mode. The power consumption of the touch screen device may be decreased as the touch screen device is driven in the lower frequency because a period for which the touch driver 50 is at the idle state is longer.

The touch controller 60 controls the touch driver 50 to operate in the third frequency 20 Hz during a portion of the sleep mode that is after the initial X frame periods in the sleep mode. More specifically, the touch controller 60 outputs the frequency control signal FS having the third value to the touch driver 50 after the initial X frame periods in the sleep mode. The touch driver 50 supplies the touch driving signals TS1 to TSp to the touch driving lines C1 to Cp according to the third frequency 20 Hz based on the frequency control signal FS having the third value. The touch driver 50 converts the sensing signals from the touch electrodes 12 into the touch raw data TRD. The touch driver 50 outputs the touch raw data TRD to the touch controller 60 according to third frequency 20 Hz.

The touch controller 60 sets the touch driving frequency at the third frequency 20 Hz as shown in FIG. 6 when the touch raw data TRD equal to or greater than the second reference value (VR2) are not input to the touch controller 60. (See S106 and S107 in FIG. 5)

Fifth, in step S107, touch raw data TRD is compared to a second reference value. The touch controller 60 may determine that a user's touch is generated or expected when the touch raw data TRD equal to or greater than the second reference value are input to the touch controller 60 after the initial X frame periods in the sleep mode. The second reference value is equal to or lower than the first reference value. In step S108, the touch controller 60 sets the touch driving frequency TDF at the second frequency 40 Hz during Y frame periods in the sleep mode when the touch raw data TDR equal to or greater than the second reference value are input to the touch controller 60 after the initial X frame periods in the sleep mode. The embodiment of the present invention may set the touch driving frequency TDF as the second frequency 40 Hz to increase the touch recognition rate when it is determined that the user's touch is generated or expected for driving the touch driving frequency TDF as the third frequency 20 Hz.

The touch controller 60 controls the touch driver 50 to operate at the second frequency 40 Hz during a portion of the sleep mode that includes the Y frame periods. More specifically, the touch controller 60 outputs the frequency control signal FS having the second value to the touch driver 50 during the Y frame periods in the sleep mode. The touch driver 50 supplies the touch driving signals TS1 to TSp to the touch driving lines C1 to Cp according to the second frequency 40 Hz based on the frequency control signal FS having the second value. The touch driver 50 converts the sensing signals from the touch electrodes 12 into the touch raw data TRD. The touch driver 50 outputs the touch raw data TRD to the touch controller 60 according to second frequency 40 Hz.

In step S109, touch raw data TRD is compared to the first reference value. The touch controller 60 determines that the user's touch is generated when the touch raw data TRD equal to or greater than the first reference value are input to the touch controller 60. In this case, the touch controller 60 outputs the wake up signal WS to the main processor 70 in step S105. The main processor 70 wakes and operates in the normal mode when the wake up signal WS is input to the main processor 70. Thus, the sleep mode is ended.

The touch controller 60 sets the touch driving frequency TDF to the third frequency 20 Hz when the touch raw data TRD equal to or greater than the first reference value are not input to the touch controller 60 during the Y frame period in the sleep mode. (See S105, S106, S108 and S109 in FIG. 5)

As described above, the embodiment of the present invention changes the touch driving frequency TDF at least once in the sleep mode. More specifically, the embodiment of the present invention is basically driven in the third frequency (20 Hz) in the sleep mode, however the third frequency 20 Hz changes to the second frequency 40 Hz when it is determined that the user's touch is generated or expected. As a result, the embodiment of the present invention may increase the touch recognition rate in the sleep mode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of operation in a touch sensitive display device supporting a normal mode and a sleep mode, the touch sensitive display device comprising data lines coupled to pixels of the touch sensitive display device, the method comprising:
   supplying one or more touch driving signals to touch driving lines at a first frequency during the normal mode of the touch sensitive display device, the data lines of the touch sensitive display device supplied with data voltages during the normal mode;
   supplying the one or more touch driving signals to the touch driving lines at a second frequency lower than the first frequency during a first portion of the sleep mode immediately following the normal mode, the data lines of the touch sensitive display device not being supplied with data voltages during the sleep mode;
   generating first raw touch data based on the one or more touch driving signals supplied at the second frequency during the first portion of the sleep mode;
   sensing touch by comparing the first raw touch data to a first reference;
   responsive to expiration of a predetermined number of frame periods in the first portion of the sleep mode without the first touch data indicating a touch, supplying the one or more touch driving signals to the touch driving lines at a third frequency lower than the second frequency during a second portion of the sleep mode;

generating second raw touch data based on the one or more touch driving signals supplied at the third frequency during the second portion of the sleep mode; and sensing touch by comparing the second raw touch data to a second reference different than the first reference.

2. The method of claim 1, wherein the second reference is lower than the first reference.

3. The method of claim 1, further comprising:
waking the touch sensitive display device to return to the normal mode responsive to the first raw touch data exceeding the first reference during the first portion of the sleep mode.

4. The method of claim 3 further comprising:
responsive to the second raw touch data exceeding the second reference, again supplying the one or more touch driving signals to the touch driving lines at the second frequency during a third portion of the sleep mode.

5. The method of claim 4, further comprising:
responsive to third raw touch data sensed during the third portion of the sleep mode exceeding the first reference, waking the touch sensitive display device to return to the normal mode.

6. A touch sensitive display device supporting a normal mode and a sleep mode, comprising:
pixels and data lines coupled to the pixels;
touch driving lines;
a touch driver to supply one or more touch driving signals to the touch driving lines, the touch driver to:
supply the one or more touch driving signals at a first frequency during the normal mode of the touch sensitive display device, the data lines supplied with data voltages during the normal mode;
supply the one or more touch driving signals at a second frequency lower than the first frequency during a first portion of the sleep mode immediately following the normal mode, the data lines of the touch sensitive display device not being supplied with data voltages during the sleep mode,
generate first raw touch data based on the one or more touch driving signals supplied at the second frequency during the first portion of the sleep mode;
sense touch by comparing the first raw touch data to a first reference;
responsive to expiration of a predetermined number of frame periods in the first portion of the sleep mode without the first touch data indicating a touch, supply the one or more touch driving signals to the touch driving lines at a third frequency lower than the second frequency during a second portion of the sleep mode;
generate second raw touch data based on the one or more touch driving signals supplied at the third frequency during the second portion of the sleep mode; and
sense touch by comparing the second raw touch data to a second reference different than the first reference.

7. The touch sensitive display device of claim 6, wherein the second reference is lower than the first reference.

8. The touch sensitive display device of claim 6,
wherein the touch controller wakes the touch sensitive display device to return to the normal mode responsive to the first raw touch data sensed during the first portion of the sleep mode exceeding the first reference.

9. The touch sensitive display device of claim 8, wherein the touch driver again supplies the touch driving signals to the touch lines at the second frequency during a third portion of the sleep mode responsive to the second raw touch data exceeding the second reference.

10. The touch sensitive display device of claim 9, wherein the touch controller wakes the touch sensitive display device to return to the normal mode responsive to third raw touch data sensed during the third portion of the sleep mode exceeding the first reference.

11. A driver circuit to drive touch driving lines of a display device that supports a normal mode and a sleep mode, the touch sensitive display device comprising data lines coupled to pixels of the touch sensitive display device, the driver circuit comprising:
first circuitry to supply one or more touch driving signals to the touch driving lines, the first circuitry to:
supply the one or more touch driving signals at a first frequency during the normal mode of the touch sensitive display device, the data lines of the touch sensitive display device supplied with data voltages during the normal mode;
supply the one or more touch driving signals at a second frequency lower than the first frequency during a first portion of the sleep mode immediately following the normal mode, the data lines of the touch sensitive display device not being supplied with data voltages during the sleep mode, touch being sensed;
generate first raw touch data based on the one or more touch driving signals supplied at the second frequency during the first portion of the sleep mode;
sense touch by comparing the first raw touch data to a first reference;
responsive to expiration of a predetermined number of frame periods in the first portion of the sleep mode without the first touch data indicating a touch, supply the one or more touch driving signals to the touch driving lines at a third frequency lower than the second frequency during a second portion of the sleep mode; and
generate second raw touch data based on the one or more touch driving signals supplied at the third frequency during the second portion of the sleep mode; and
sense touch by comparing the second raw touch data to a second reference different than the first reference.

12. The driver circuit of claim 11 wherein the second circuitry wakes the touch sensitive display device to return to the normal mode responsive to the first touch data sensed during the first portion of the sleep mode exceeding the first reference.

13. The driver circuit of claim 12, wherein the first circuitry again supplies the touch driving signals to the touch lines at the second frequency during a third portion of the sleep mode responsive to the second raw touch data exceeding the second reference.

14. The driver circuit of claim 13, wherein the second circuitry wakes the touch sensitive display device to return to the normal mode responsive to third raw touch data sensed during the third portion of the sleep mode exceeding the first reference.

* * * * *